United States Patent
Bender et al.

(10) Patent No.: US 7,003,797 B2
(45) Date of Patent: Feb. 21, 2006

(54) SECURE PERSONAL IDENTIFICATION NUMBER ENTRY IN A DISTRIBUTED NETWORK

(75) Inventors: Michael S. Bender, Boulder Creek, CA (US); Fabio Pistolesi, Biviers (FR)

(73) Assignee: Sun Microsystems, Inc., Santa Clara, CA (US)

( * ) Notice: Subject to any disclaimer, the term of this patent is extended or adjusted under 35 U.S.C. 154(b) by 724 days.

(21) Appl. No.: 09/861,073

(22) Filed: May 18, 2001

(65) Prior Publication Data

US 2003/0046590 A1    Mar. 6, 2003

(51) Int. Cl.
  *G06F 17/00*    (2006.01)
(52) U.S. Cl. .................................. 726/9; 726/8; 726/15
(58) Field of Classification Search ........ 713/200–202; 726/8–9, 15
  See application file for complete search history.

(56) References Cited

OTHER PUBLICATIONS www.comptechdoc.org/os/windows/win2k/win2kauthentication.html.*
www.google.com's text cache of www.microsoft.com/technet/security/bulletin/MS01-029.mspx.*
A network-based platform for multi-application smart cards; Toji, R.; Wada, Y.; Hirata, S.; Suzuki, K.; Enterprise Distributed Object Computing Conference, 2001. EDOC '01. Proceedings, Fifth IEEE International Sep. 4-7 2001 Page(s):34-45.*
Smart card security for field area networks; Palensky, P.; Control and Communications, 2003, SIBCON 2003. The IEEE-Siberian Conference on Oct. 1-2, 2003 Page(s): 135-138.*
A smart card network in health care services;Gogou, V.; Pavlopoulos, S.; Karayiannis, D.; Koutsouris, D.; Engineering in Medicine and Biology Society, 2000. Proceedings of the 22nd Annual International Conference of the IEEE Page(s):559-561 vol. 1.*

* cited by examiner

*Primary Examiner*—David Jung
(74) *Attorney, Agent, or Firm*—Martine Penilla Gencarella, LLP (57) ABSTRACT

The present invention relates to secure PIN entry in a distributed network. According to one or more embodiments of the present invention, a client connected to a server contains logic that is used to keep the PIN within the network computer and not send it over the network. In one embodiment, the server sends an instruction to the networked computing device telling it to capture a PIN locally. This instruction causes the networked computer to enter a secure PIN entry mode which logically disconnects the keyboard from the server. Upon receipt of the instruction from the server, one embodiment of the present invention receives keyboard entries on the client computer and places them into a local buffer. The client continues buffering the keyboard entries until an indication that the process is complete. Upon completion of the keyboard entries, they are translated into ASCII characters by the client and sent from the local client buffer to the smart card where the PIN may be verified.

8 Claims, 9 Drawing Sheets

SECURE PERSONAL IDENTIFICATION NUMBER ENTRY IN A DISTRIBUTED NETWORK

BACKGROUND OF THE INVENTION

1. Field of the Invention

The present invention relates to security in a distributed network. More specifically, the invention relates to authenticating a personal identification number (PIN) in a distributed network without sending the PIN over the network Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright tights whatsoever.

2. Background Art

When logging in to a distributed network of computing devices, it is typical for a security measure to be in place which insures the identity of the individual logging in. One manner where this occurs is on a system that uses a smart card. The user inserts the card into a card reading device attached to the computing system and enters a personal identification number (PIN) onto a keyboard or other input device of the computing system. If the PIN number is authenticated then the user logs in and begins using the distributed network.

As will be further explained below, the manner in which the PIN number is currently authenticated is vulnerable to snooping attacks from untrusted third parties that might use the PIN to compromise the network. Before further describing the problems associated with current techniques which authenticate PINs, an example computing environment where this problem occurs is described below.

Multi-Tier Application Architecture

In the multi-tier application architecture, a client communicates requests to a server for data, software and services, for example, and the server responds to the requests. The server's response may entail communication with a database management system for the storage and retrieval of data. The multi-tier architecture includes at least a database tier that includes a database server, an application tier that includes an application server and application logic (i.e., software application programs, functions, etc.), and a client tier. The application server responds to application requests received from the client. The application server forwards data requests to the database server.

Figure 1:
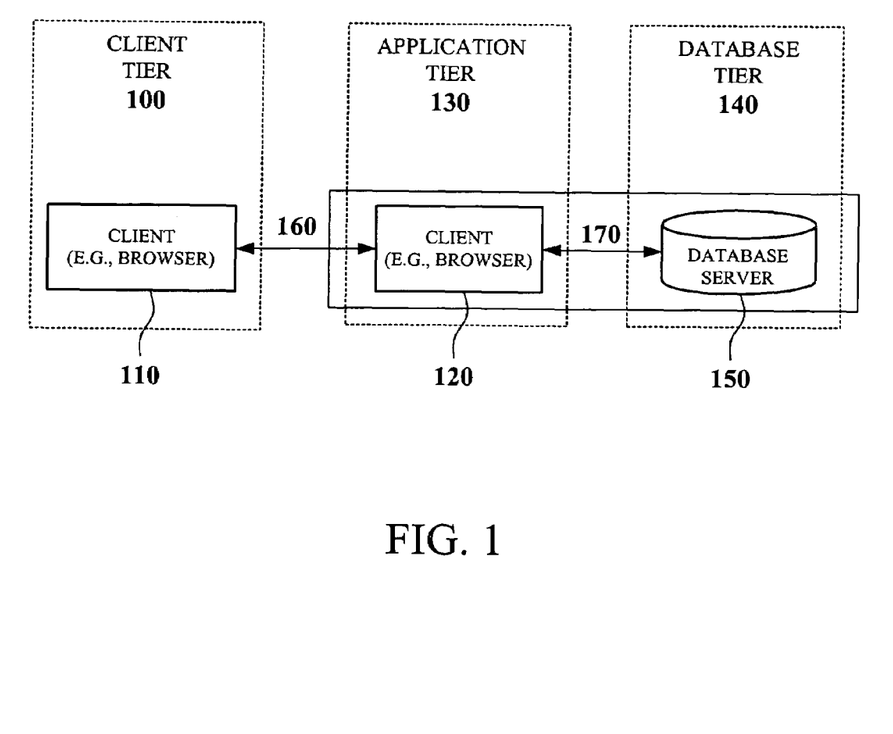
FIG. 1 shows an example of a multi-tier application architecture.

FIG. 1 provides an overview of a multi-tier architecture. Client tier 100 typically consists of a computer system that provides a graphic user interface (GUI) generated by a client 110, such as a browser or other user interface application. Conventional browsers include Internet Explorer and Netscape Navigator, among others. Client 110 generates a display from for example, a specification of GUI elements (e.g., a file containing input, form, and text elements defined using the Hypertext Markup Language (HTML)) and/or from an applet (i.e., a program such as a program written using the Java™ programming language, or other platform independent programming language, that runs when it is loaded by the browser).

Further application functionality is provided by application logic managed by application server 120 in application tier 130. The apportionment of application functionality between client tier 100 and application tier 130 is dependent upon whether a "thin client" or "thick client" topology is desired. In a thin client topology, the client tier (i.e., the end user's computer) is used primarily to display output and obtain input, while the computing takes place in other tiers. A thick client topology, on the other hand, uses a more conventional general purpose computer having processing, memory, and data storage abilities. Database tier 140 contains the data that is accessed by the application logic in application tier 130. Database server 150 manages the data, its structure and the operations that can be performed on the data and/or its structure.

Application server 120 can include applications such as a corporation's scheduling, accounting, personnel and payroll applications, for example. Application server 120 manages requests for the applications that are stored therein. Application server 120 can also manage the storage and dissemination of production versions of application logic. Database server 150 manages the database(s) that manage data for applications. Database server 150 responds to requests to access the scheduling, accounting, personnel and payroll applications' data, for example.

Connection 160 is used to transmit data between client tier 100 and application tier 130, and may also be used to transfer the application logic to client tier 100. The client tier can communicate with the application tier via, for example, a Remote Method Invocator (RMI) application programming interface (API) available from Sun Microsystems™. The RMI API provides the ability to invoke methods, or software modules, that reside on another computer system. Parameters are packaged and unpackaged for transmittal to and from the client tier. Connection 170 between application server 120 and database server 150 represents the transmission of requests for data and the responses to such requests from applications that reside in application server 120.

Elements of the client tier, application tier and database tier (e.g., client 110, application server 120 and database server 150) may execute within a single computer. However, in a typical system, elements of the client tier, application tier and database tier may execute within separate computers interconnected over a network such as a LAN (local area network) or WAN (wide area network).

Security Measures

Smart cards are used in environments like the multi-tier application architecture as a security measure to insure the identity of the user when he/she logs into a computing device on the client tier. Once identified, data on the database tier and applications on the application tier may be used. One advantage associated with using a smart card or other identification technique is that no matter where the computing device is located on the client tier, the same data and applications that the user needs, or was using before his/her last log-off, can be retrieved.

Smart cards are useful for securely storing secret information and embedding cryptographic algorithms for use in a cryptographic system. In many cases, the smart card requires the presentation of a secret that only the cardholder knows. Sometimes this secret is contained in a PIN number. Since the smart card itself has no mechanism for interacting with a human being (i.e., no keyboard or display), it requires the system it is being used with to provide the human I/O facilities to prompt the cardholder for a PIN and to accept the cardholder's input of the PIN, typically on a keyboard or other suitable input device.

As the PIN is being entered on the keyboard, it is vulnerable to a snooping attack where an untrusted third party might be able to access the PIN and compromise it. In the case where the smart card is coupled to a client computer system, the keyboard typically sends keyboard codes across an unencrypted network link to a server. The server, in turn, returns the keyboard codes to the client for presentation to the smart card. In this scenario, the keyboard codes are vulnerable to an interception attack at two points—on their way from the client to the server and on their way back from the server to the client. Moreover, since the keyboard codes of the PIN are resident on the server, at least for the time required to send those codes back to the client system, the PIN is vulnerable to a snooping attack while it is on the server.

One solution is to provide a smart card reader with a built in key pad used to enter the PIN. This avoids the danger of snooping that might occur when the PIN is authenticated via a server on the distributed network. This solution, however, is disadvantageous because it requires expensive and dedicated hardware to authenticate the PIN.

SUMMARY OF THE INVENTION

The present invention relates to secure PIN entry in a distributed networks. According to one or more embodiments of the present invention, a client connected to a server contains logic that is used to keep the PIN within the network computer and not send it over the network. In one embodiment, the server sends an instruction to the networked computing device telling it to capture a PIN locally. This instruction causes the networked computer to enter a secure PIN entry mode which logically disconnects the keyboard from the server.

Upon receipt of the instruction from the server, one embodiment of the present invention receives keyboard entries on the client computer and places them into a local buffer. The client continues buffering the keyboard entries until an indication that the process is complete. This may occur, for instance, when a user presses an enter key on the keyboard or selects an icon within a graphical user interface.

Upon completion of the keyboard entries, they are translated into ASCII characters by the client and sent from the local client buffer to the smart card. This may occur, for instance, by using an application protocol data unit (APDU) format wherein the ASCII characters that represent the PIN are embedded into the APDU using patterns that may be decoded by the smart card reader. The decoded patterns are used, for instance, to extract the PIN and verify its authenticity so that the user may log in to the network and begin computing. The keyboard codes that represent the PIN typically enable the smart card to perform some cryptographic function or to release secure data outside the smart card.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention relates to secure PIN entry in a distributed network. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Secure PIN Entry

Figure 2:
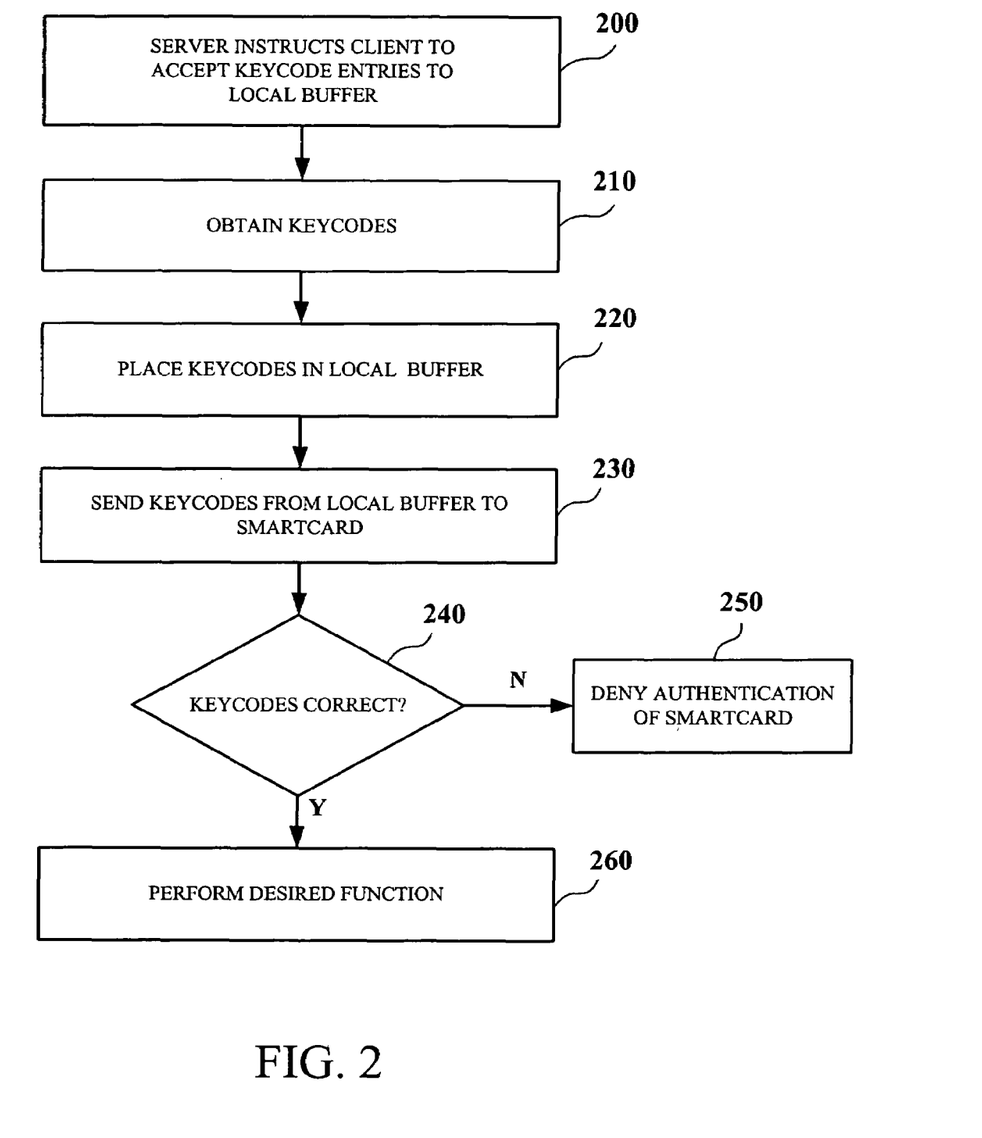
FIG. 2 shows secure PIN entry in a distributed network according to an embodiment of the present invention.

One embodiment of the secure entry of a PIN in a distributed network is described in FIG. 2. At step 200, a client connected to a server is instructed by the server to accept keycode entries into a local buffer as an alternative to sending the keycodes across the network to the server. At step 210 the keycodes are obtained. The keycodes represent the PIN entered by the user. They are obtained, for example, through a keyboard connected to a client computer. At step 220 the keyboard codes are placed in a local buffer of the client. When the keycodes are needed, the codes are sent from the local client buffer to the smart card at step 230. At step 240 it is determined if the keycodes are correct. If they are not, the authentication of the smart card is denied at step 250. If they are, the smart card performs a cryptographic function or releases secure data outside the smart card at step 260.

Figure 3:
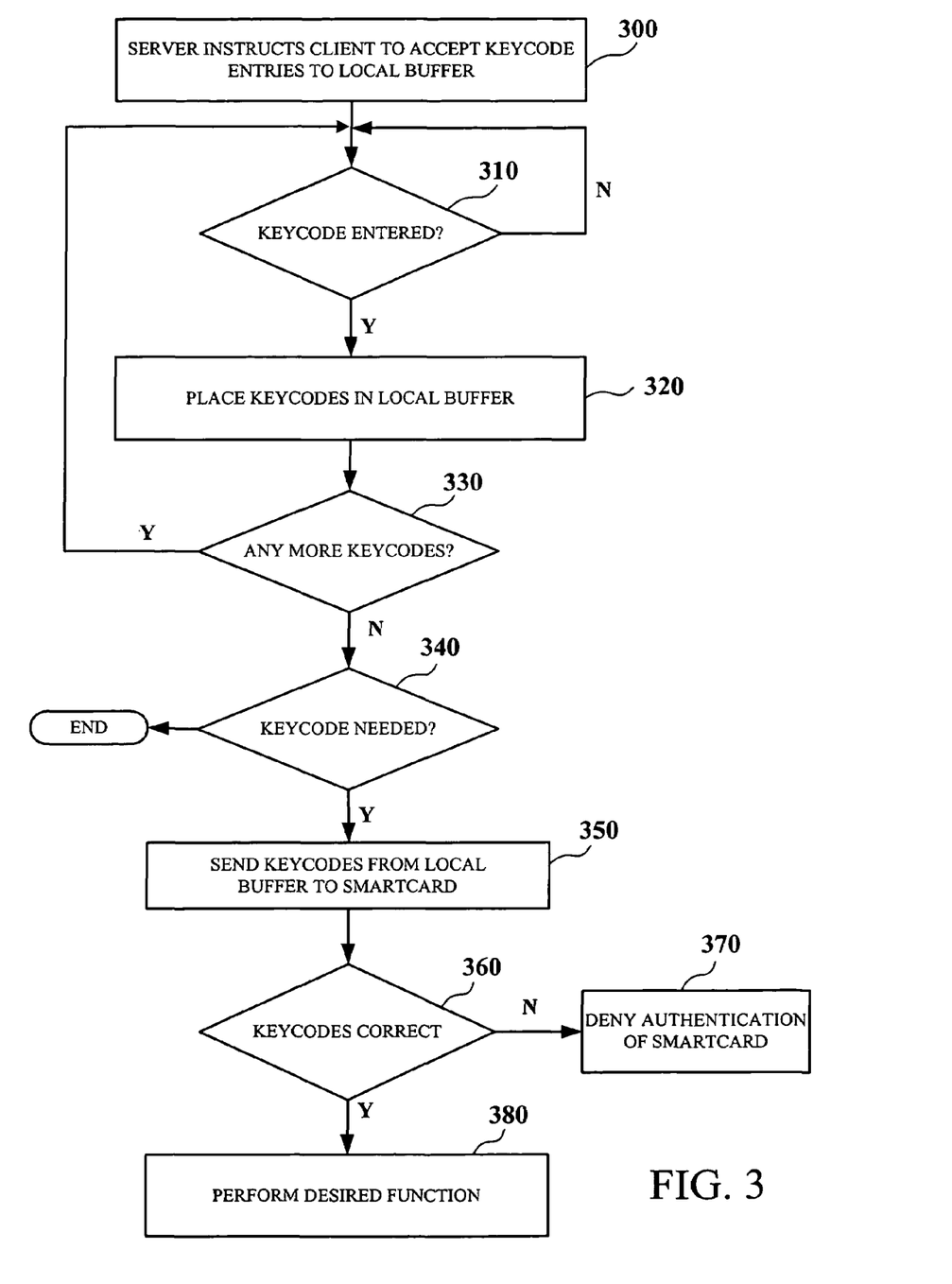
FIG. 3 shows secure PIN entry in a distributed network according to an embodiment of the present invention.

Another embodiment of the secure entry of a PIN in a distributed network is described in FIG. 3. At step 300, a client connected to a server is instructed by the server to accept keycode entries into a local buffer. At step 310 it is determined whether a keycode has been entered (i.e., the user has pressed a key on the keyboard). If not, the process waits at step 310 until a keycode is obtained. When a keycode is obtained, the keyboard code is placed in a local buffer at step 320.

At step 330, it is determined whether there are any more keycode entries. If there are the process repeats at step 310. Otherwise, it is determined at step 340 whether the keycodes are needed, for instance to authenticate the PIN entries for a smart card holder. If not, the process terminates. Otherwise, the codes are sent from the local client buffer to the smart card at step 350. At step 360 it is determined if the keycodes are correct. If they are not, the authentication of the smart card is denied at step 370. If they are, the smart card performs a cryptographic function or releases secure data outside the smart card at step 380.

Figure 4:
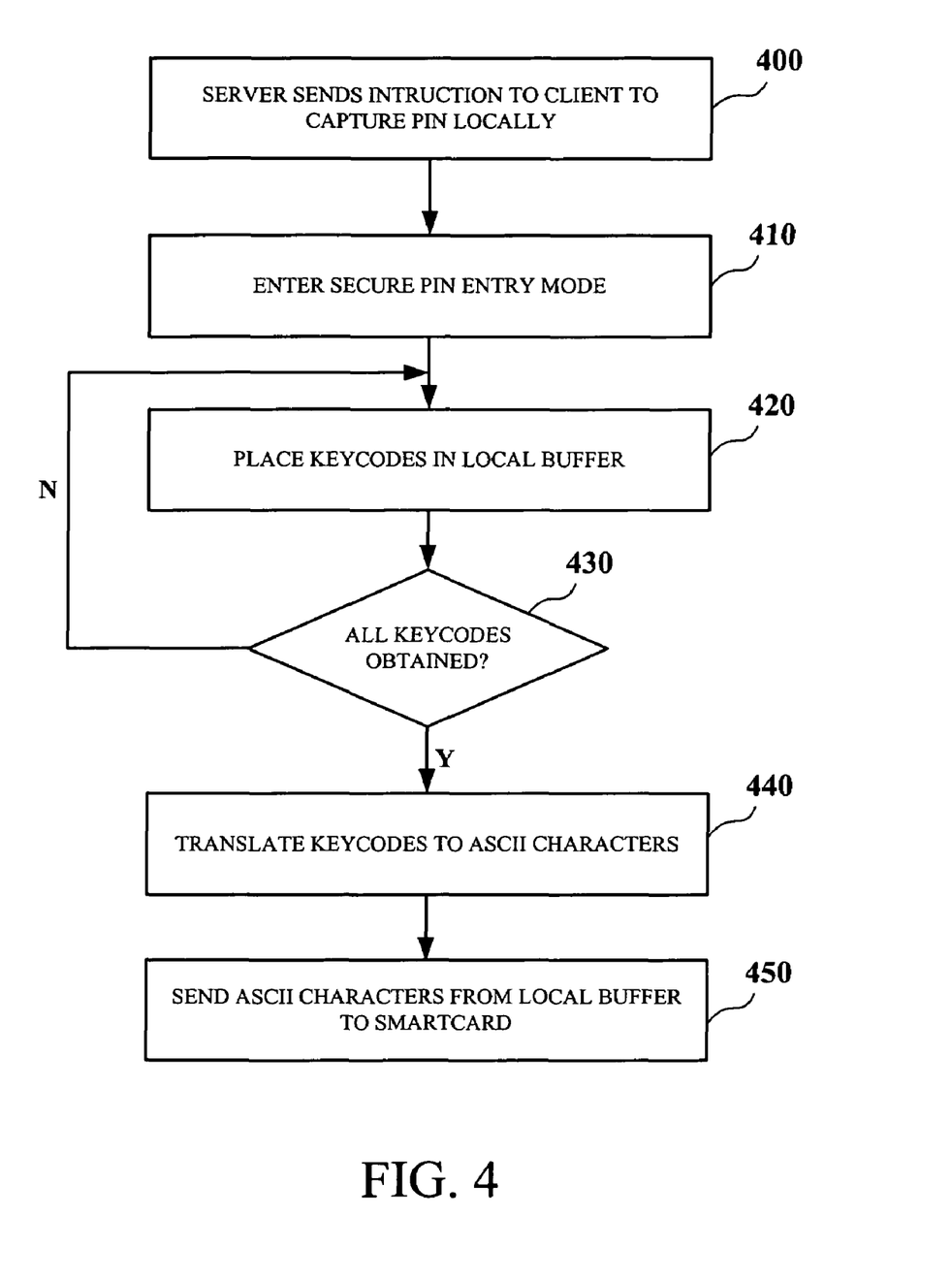
FIG. 4 shows secure PIN entry in a distributed network according to an embodiment of the present invention.

In another embodiment of the present invention, the client connected to a server contains logic that is used to keep the PIN within the network computer and not send it over the network. This embodiment is shown in FIG. 4 where at step 400 the server sends an instruction to the networked computing device telling it to capture a PIN locally. This instruction causes the networked computer to enter a secure PIN entry mode at step 410 which logically disconnects the keyboard from the server.

Next, at step 420 as the keyboard entries are received on the client computer, they are placed into a local buffer. At step 430, it is determined whether all of the keycode entries have been obtained. If not, the client continues buffering the keyboard entries by repeating step 420. When the process is complete at step 430, for instance, when a user presses an enter key on the keyboard or selects an icon within a graphical user interface, they are translated into ASCII characters at step 440 by the client and sent from the local client buffer to the smart card at step 450. Step 450 is accomplished, for instance, by using an application protocol data unit (APDU) format wherein the ASCII characters that represent the PIN are embedded into the APDU using patterns that may be decoded by the smart card reader and used to verify the authenticity of the PIN.

Smart Card Architecture

Figure 5:
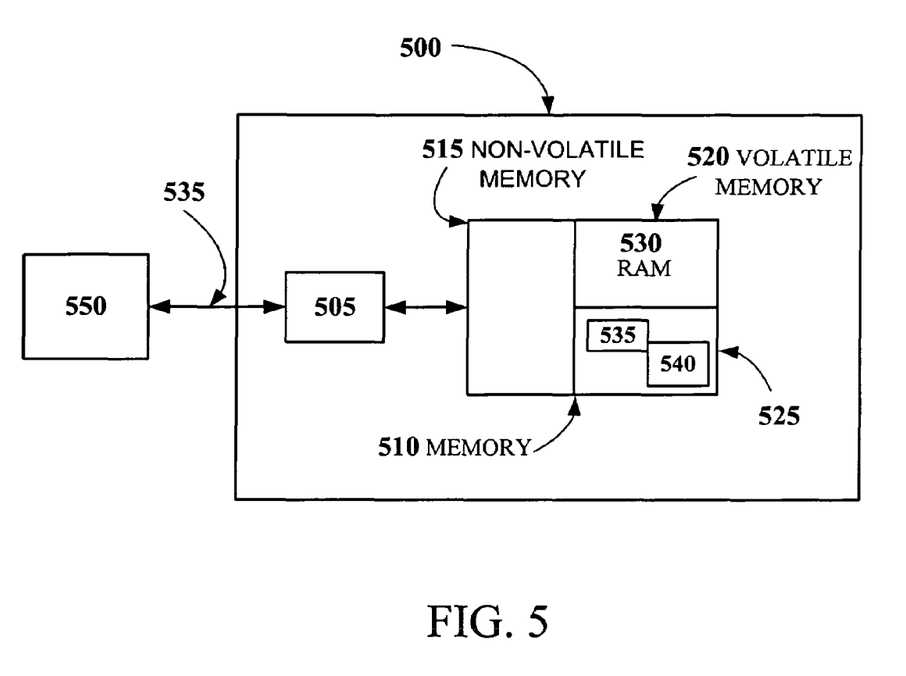
FIG. 5 shows an example of a smart card architecture.

FIG. 5 shows the architecture of one embodiment of a smart card that may be used with the present invention. The smart card 500 has a processor 505. This processor may be of limited capacity, such as an 8-bit processor, since the smart card's computational power is limited. The smart card has a memory 510 coupled to the processor which is divided up into non-volatile memory 515 and volatile memory 520. The volatile memory is further divided into EEPROM 525 and RAM 530. The EEPROM contains the operating program for the smart card 535 and other code 540, such as the code necessary to encrypt data and so on.

In one embodiment, the smart card has the ability to have software downloaded into its non-volatile memory where it can execute the program by moving it to RAM where the smart card will act according to the instructions of the computer software. The smart card further has a communications channel 535 between the processor and an external source 550 such as a host computer.

The processor in the smart card is configured to retain information within the smart card that is secret. For instance, a secret key in the smart card will never be divulged across the communications channel 535. The smart card will, however, allow information to come in across the communication channel and use the data. For instance, the smart card is configured to receive data from an external source across the communications channel, for instance as an APDU, to use the secret key in the smart card, for example to sign and encrypt the incoming data, and to send the results out along the communications channel 535 to the external source 550.

Smart Card Reader Protocol

The protocol makes use of a device manager/remote device driver (DM/RDD) layer as transport mechanism. When the host wants to communicate with the smartcard, the EXCHANGE primitive is used, and the transfer of data follows these rules:

a) Commands are specified as "CMD=xxx" as header of the string.

b) All parameters, if any, follow in the string.

c) Each parameter is a key/value pair.

Not all operations are atomic, for example changing the PIN on a card could require asking for the old PIN, the new PIN and a second copy of the PIN as confirmation. Only if the two copies match will the APDU for writing the new PIN on the card be sent. All the while, the user may want to do other things. To address this, a small "language" is defined. All commands are atomically and sequentially executed, no two commands are in execution at the same time.

One feature is to type a PIN without sending it to the Host, but directly to the smartcard, in a sort of loopback mode. Again, this is not always possible right away, so we need a way to type a PIN and temporarily store it until it can be embedded in an APDU to the card. Some operations, like entering/exiting the loopback keyboard mode and downloading the keymaps, are accomplished via control callback.

Typical operation requires the service to enter secure mode, download a keytable, and operate. In case a keytable has not been specified, some commands cannot execute, notably READ, CMP, APDU. The latter is a special case, since an APDU could be sent to the card independently of Secure Mode. In that case the keytable error is generated when reference to a buffer is made in the APDU itself.

An LED near the smartcard reader will blink according to the following rules as described by the Sun Service Indicator Standard which covers user-visable indicators on Sun platforms:

No LED activity
    There is no readable card in the reader.
Green LED blinking
    While in Secure PIN Entry Mode the blink rate should be 3–5
    Hertz at a 50% on, 50% off duty cycle for the duration that the mode is active.
    While data is being exchanged with the card, the LED shall flash at a random or intermittent rate for no less than 1 full second with the LED ending in the lit state.
Green LED fully lit
    The smart card has been read and is ready (i.e. The card is still able to be accessed).

There is another primitive available via RDD, CONTROL. This call is used to initiate/terminate Secure PIN Entry Mode, download the keytable and to signal cancellation of an operation.

For operations to be successfully carried on, the DM notification facilities are used to tell the DM service about card properties, keyboard attached to the unit and keypresses. These internal properties are embedded in a message in the format described below.

---

Key/value Description for EXCHANGE
    A sample transaction could be:
        Host                DTU
    "CMD=APDU APDU=00B0000008"
                              "RES=760833EF PB=60 STATUS=9000"
    (values random)
    Where I asked for a certain APDU to be sent to the card and the result is sent back along with the procedure bytes and status.
    All described parameter and return keys have a
    <Key>=<value> syntax.
    CMD=    Description and values
    APDU    Asks for a certain APDU to be sent to the card.
        Parameters:
            Key
            APDU    APDU's bytes as an HexDump string. Buffers are
                referred to by 'X' for buffer 0, 'Y' for buffer 1
                'Z' for buffer 2. Each buffer specification is
                prepended by 'P'. a byte specified as "PP" means
                a pad byte.
                For more information, see APDUpatterns.txt
                'L' means substitute the apdu lenght.
                This pair is mandatory.
                FP specifies in HexDump format the byte to use as pad
                This pair is optional.
        Returns:
            Key
            RES    the hexdump bytes from the card
            PB    procedure bytes
            STATUS the status bytes
        All return pairs are mandatory unless an error has occurred
    READ   reads a series of keystrokes from the keyboard
        Parameters:
            Key
            BN     The number of the buffer where henceforth
                keycodes will be stored. 'S' will be used -continued

```
                to signal "stop buffering keycodes"
        EP      Specifies options to report keypresses.
                Default behaviour is to report keypresses
                belonging to the downloaded keytable only.
                Values for this keyword are as follows:
                    KS    Does not send notifications back on keys
                          presses for any key except Enter,
                          backspace and escape
                    NP    Sends a notification each time a key not
                          belonging to the specified key-table
                          has been pressed
        This pair is optional.
        Returns:
            Key
            READ    the current buffer number.
CMP     compares two the translated keycode buffers
        Parameters:
            Key
            BN1 first buffer number
            BN2 second buffer number
        Example:
            CMD=CMP BN1=0 BN2=1
        Returns:
            Key
            CMP "1" is ther is a match. "0" no match.
        Exactly one of the two pair is acceptable.
CLR     clears a buffers.
        Parameters:
            Key
            BN a buffer number
        If absent all buffers are cleared.
        Example:
            CMD=CLR BN=1
        Returns:
            Key
            CLR "OK".
PAUSE   Suspends keyboard loopback mode.
        No input parameters.
        Returns:
            key
            PAUSE "OK".
RESUME Re-enters keyboard loopback mode.
        No input parameters.
        Returns:
            key
            RESUME "OK".
Error codes for EXCHANGE
```

Some error return values are defined for cases in which parameters do not comply with the protocol. So instead of the return keyvalue pairs described above, a keypair ERR=< . . . > is returned with the following values defined:

```
ERR=    Description
NOKT    No keytable is present. command cannot continue.
PE      In case the command is not recognized, or general
        parsing error.
NB      No buffer number has been specified in a READ
        command.
WB      An illegal buffer number has been specified.
        one or more BN=xx keypairs will specify which
        buffer number is illegal.
MB      in case of a CMP command, one buffer number has
        not been specified.
NO      The unit is not operating in Secure Pin entry mode.
```

Key/Value Description for CONTROL

```
A sample transaction could be:
    Host          DTU (Desk Top Unit)
    "CTRL=ON"
                  "KT=060021"
```

An attempt has been mad to enter Secure PIN ENtry Mode, and the unit sent back the Keytable necessary for entering a PIN.

All described parameter and return keys have a <Key>=<value> syntax.

```
CTRL=   Description and values
ON      Enter Secure PIN Entry Mode (this is also referred
        to as "loopback mode").
        Parameters:
            (none)
        Returns:
            Key
            KT    Required Keytables, See KeytableDownloadFormat.txt
                  for more information.
OFF     Exit Secure PIN Entry Mode
        Parameters:
            (none)
        Returns:
            (none)
KT      Downloads a Keytable
        Parameters:
            Key
            KT    a keytable specification, as described in
                  KeytableDownloadFormat.txt
        Returns:
            (none)
INT     Interrupts the current operation
        Parameters:
            (none)
        Returns:
            (none)
Error codes for CONTROL
```

With the exception of CTRL=ON, CONTROL messages do not use the channel to send results back, but set the return message return value as follows

```
UT_SUCCESS   Command completed ok.
UT_FAILURE   Keytable download did not succeed. Bad KT=syntax
UT_ACCESS    Could not enter Sesure PIN Mode.
UT_EIO       Cannot interrupt current operation.
             Keytable download did not succeed.
             not in Secure PIN entry
             Mode
UT_NOTSUP    Wrong command
```

DM Messages

Messages to the DM have the following DM format:

sc.props=<SCBus properties>

<SCBus properties> follow a format similar to the key/value pairs as described before, but since they are embedded in a more general framework, values are separated from keys by a ':' instead of '=' and pairs are separated by '_' instead of spaces.

A property is always present, "sc.sn" a serial number assuming values from 0 to 255, in HexDump format.

Example:
device term=IEEE802.080020f56dc7 bus=sc addr=smartcard\
  sc.props=sc.sn:03_sc.kbd:060021
reports a USB type 6 keyboard, US keymap.

<SCBus Properties>

| sc. | Description |
|---|---|
| sn | Internal serial number. |
| kbd | Reports keyboard suitable for downloading a keytable via CTRL=KT. it is keyboard spec that appears in that control |
| keypress | Reports a keypress notification. Possible values are:<br>'*' character belonging to the PIN has been pressed<br>'E' ENTER has been pressed<br>'Q' ESCAPE has been pressed<br>'B' BACKSPACE has been pressed<br>'N' a character not belonging to the PIN has been pressed |
| status | Tells SmartCard reader status. Values:<br>in  a smartcard is in the reader or recognized<br>out  a smartcard is not present or has been removed |
| atr | Reports the SmartCard ATR in HexDump format |
| atr.hs | ATR History, HexDump format. |

Virtual Desktop System Architecture

Figure 6:
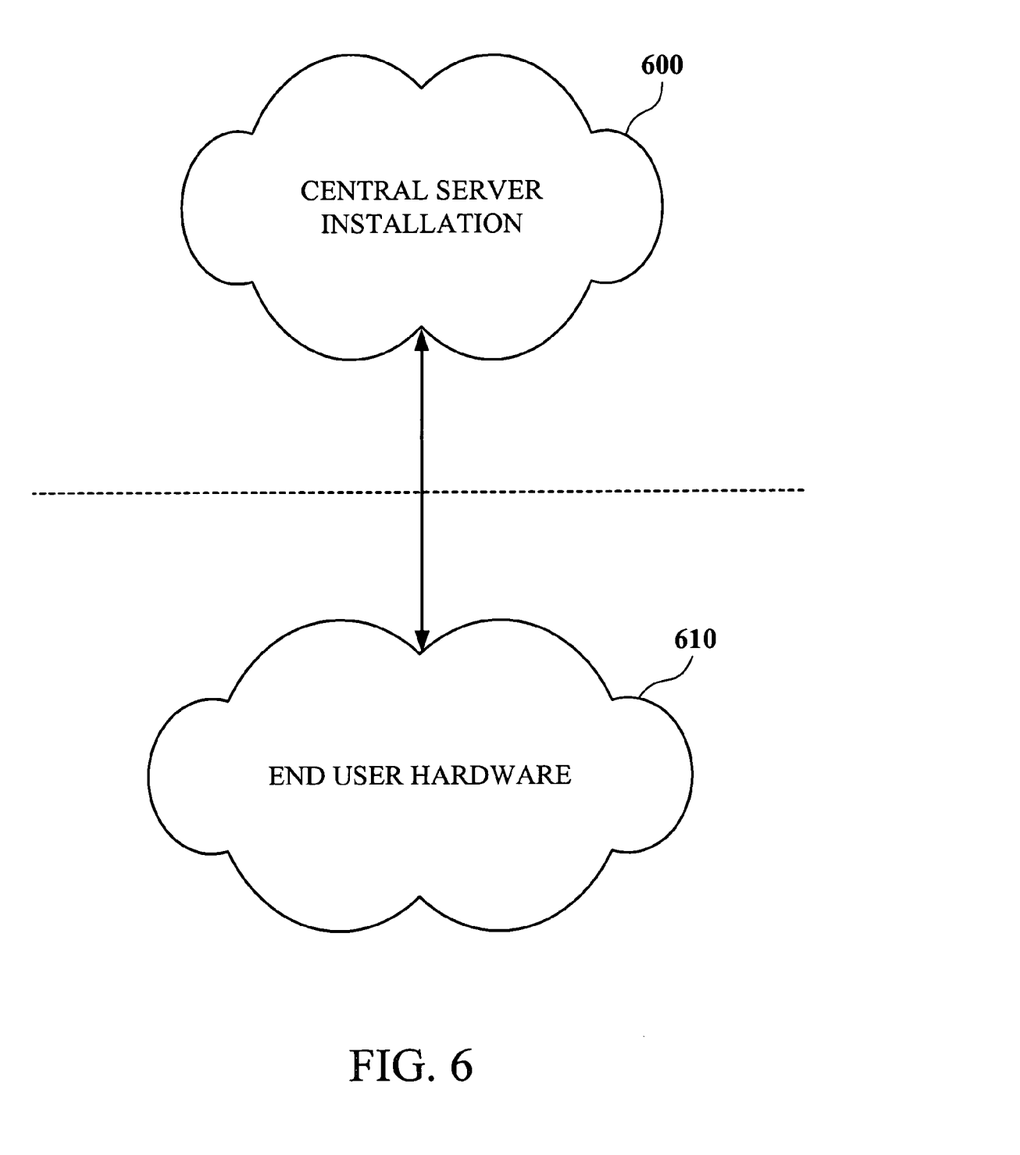
FIG. 6 shows an example of a thin client topology called a virtual desktop system architecture.

FIG. 6 shows an example of a thin client topology called a virtual desktop system architecture. The virtual desktop system architecture provides a re-partitioning of functionality between a central server installation 600 and end user hardware 610. End user hardware includes, for instance, a networked client computer attached to a smart card reader, that is used by one or more embodiments of the present invention to obtain and securely verify PIN entries from users. Data and computational functionality are provided by data sources via a centralized processing arrangement. At the user end, all functionality is eliminated except that which generates output to the user (e.g., display and speakers), takes input from the user (e.g., mouse and keyboard) or other peripherals that the user may interact with (e.g., scanners, cameras, removable storage, etc.). All computing is done by the central data source and the computing is done independently of the destination of the data being generated. The output of the source is provided to a terminal, referred to here as a "Human Interface Device" (HID). The HID is capable of receiving the data and displaying the data.

Figure 7:
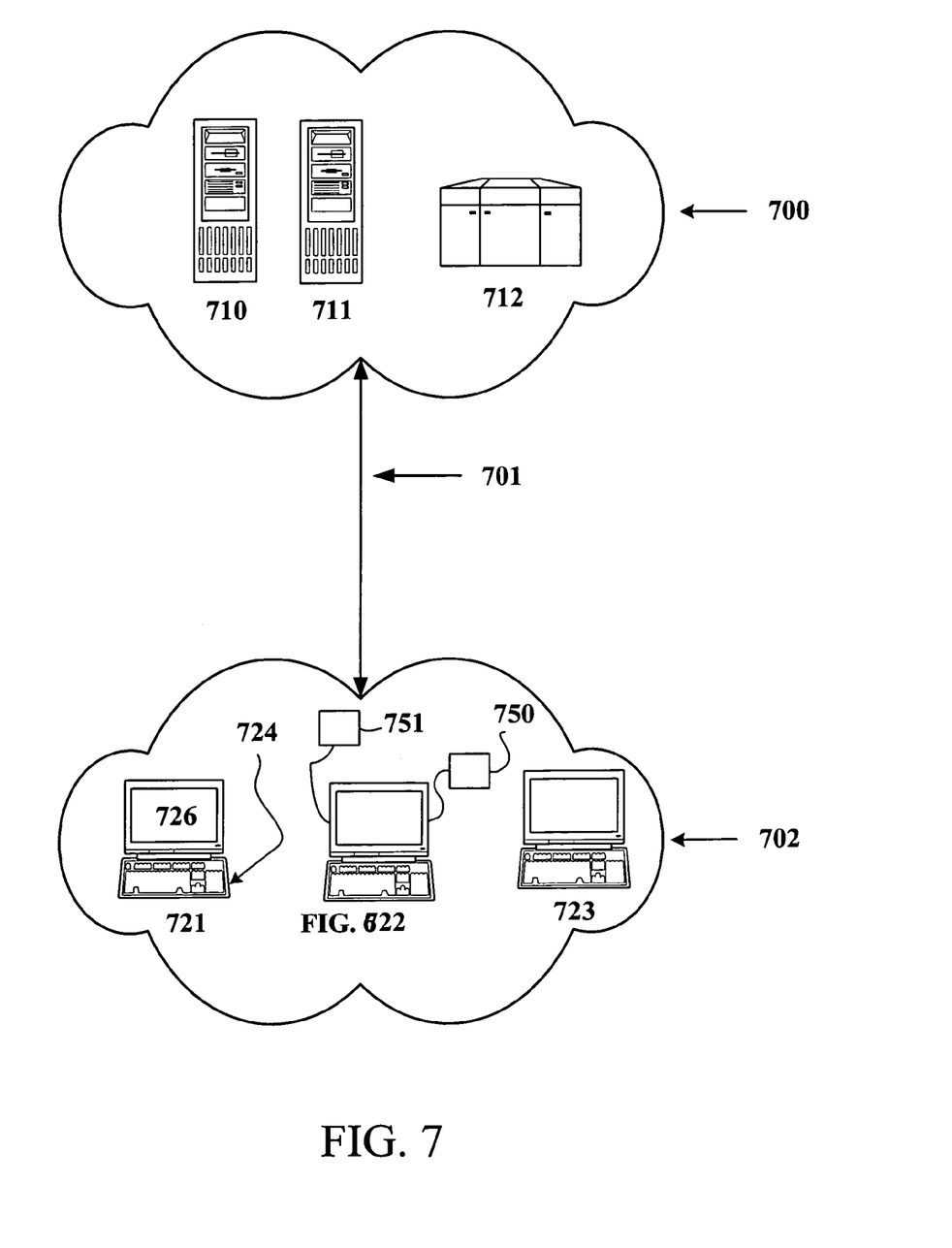
FIG. 7 displays the partitioning of the functionality of the virtual desktop system architecture.

The functionality of the virtual desktop system is partitioned between a display and input device such as a remote system and associated display device, and data sources or services such as a host system interconnected to the remote system via a communication link The display and input device is a human interface device (HID). The system is partitioned such that state and computation functions have been removed from the HID and reside on data sources or services. One or more services communicate with one or more HIDs through a communication link such as network. An example of such a system is illustrated in FIG. 7, wherein the system comprises computational service providers 700 communicating data through communication link 701 to HIDs 702.

The computational power and state maintenance are provided by the service providers or services. The services are not tied to a specific computer, but may be distributed over one or more traditional desktop systems such as described in connection with FIG. 7, or with traditional servers. One computer may have one or more services, or a service may be implemented by one or more computers. The service provides computation, state and data to HIDs and the service is under the control of a common authority or manager. In FIG. 7, the services are provided by computers 710, 711, and 712. In addition to the services, a central data source can provide data to the HIDs from an external source such as for example the Internet or world wide web. The data source can also be broadcast entities such as those that broadcast data (e.g., television and radio signals).

Examples of services include X11/Unix services, archived or live audio or video services, Windows NT service, Java™ program execution service and others. A service herein is a process that provides output data and response to user requests and input. The service handles communication with an HID currently used by a user to access the service. This includes taking the output from the computational service and converting it to a standard protocol for the HID. The data protocol conversion is handled by a middleware layer, such as the X11 server, the Microsoft Windows interface, video format transcoder, the OpenGL® interface, or a variant of the java.awt.graphics class within the service producer machine. The service machine handles the translation to and from a virtual desktop architecture wire protocol described further below.

Each service is provided by a computing device optimized for its performance. For example, a machine, such as an Enterprise class machine, maybe used to provide X11/Unix service, a Sun MediaCenter™ maybe used to provide video service, a Hydra based NT machine may provide applet program execution services. The service providing computer system can connect directly to the HIDs through the interconnect fabric. It is also possible for the service producer to be a proxy for another device providing the computational service, such as a database computer in a three-tier architecture, where the proxy computer might only generate queries and execute user interface code.

The interconnect fabric can comprise any of multiple suitable communication paths for carrying data between the services and the HIDs. In one embodiment the interconnect fabric is a local area network implemented as an Ethernet networks. Any other local network may also be utilized. The invention also contemplates the use of wide area networks, the Internet, the world wide web, and others. The interconnect fabric may be implemented with a physical medium such as a wire or fiber optic cable, or it may be implemented in a wireless environment.

The interconnect fabric provides actively managed, low-latency, high-bandwidth communication between the HID and the services being accessed. One embodiment contemplates a single-level, switched network, with cooperative (as opposed to completing) network traffic. Dedicated or shared communications interconnects maybe used in the present invention.

The HID is the means by which users access the computational services provided by the services. FIG. 7 illustrates HIDs 721, 722 and 723. Each HID comprises a display 726, a keyboard 724, mouse 751, and audio speakers 750. The HID includes the electronics need to interface these devices to the interconnection fabric and to transmit to and receive data from the services.

Figure 8:
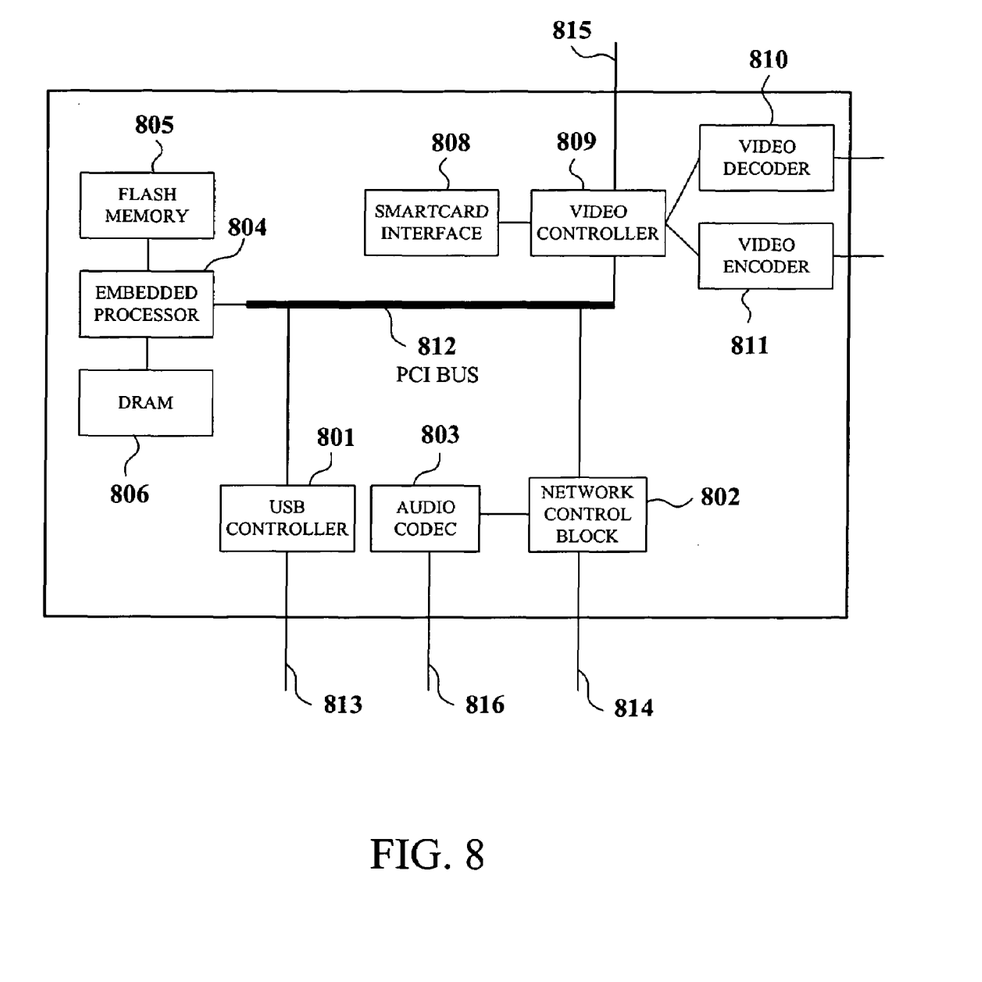
FIG. 8 is a block diagram of an example embodiment of a human interface device.

A block diagram of an example embodiment of the HID is illustrated in FIG. 8. The components of the HID are coupled internally to a bus 812. Network control block 802 communicates to the interconnect fabric, such as an Ethernet, through line 814. An audio codec 803 receives audio data on interface 816 and is coupled to network control block 802. Universal serial bus (USB) data communication is provided on lines 813 to a USB controller 801. The HID further comprises a embedded processor 804 such as a Sparc2ep processor with coupled flash memory 805 and dynamic random access memory (DRAM) 806. The USB controller 801, the network control block 802 and the embedded processor 804 are all coupled to the internal bus 812. A video controller 809, also coupled to the internal bus 812, can include an ATI RagePro+frame buffer controller which provides. Super video graphics array (SVGA) output on the line 815. National television standards committee (NTSC) data is provided in and out of the video controller through video decoder 810 and encoder 811 respectively. A smartcard interface 808 may also be coupled to the video controller 809.

Figure 9:
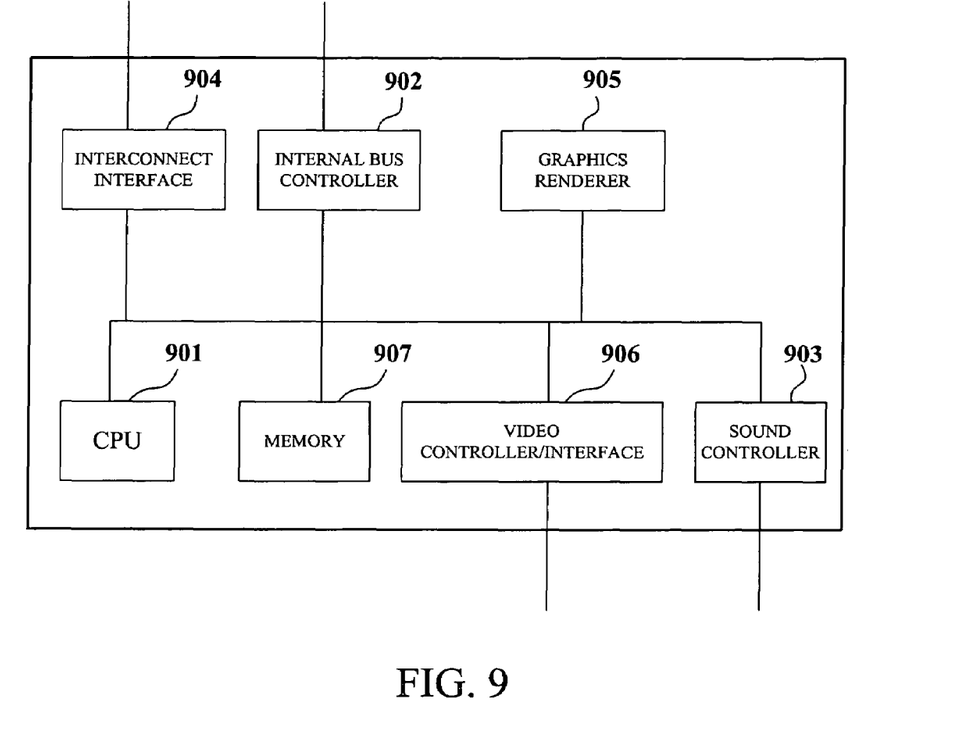
FIG. 9 is a block diagram of a single chip implementation of a human interface device.

Alternatively, the HID can comprise a single chip implementation as illustrated in FIG. 9. The single chip includes the necessary processing capability implemented via CPU 901 and graphics renderer 905. Chip memory 907 is provided, along with video controller/interface 906. A internal bus (USB) controller 902 is provided to permit communication to a mouse, keyboard and other local devices attached to the HID. A sound controller 903 and interconnect interface 904 are also provided. The video interface shares memory 907 with the CPU 901 and graphics renderer 905. The software used in this embodiment may reside locally in on-volatile memory or it can be loaded through the interconnection interface when the device is powered.

The operation of the virtual desktop system architecture is described in co-pending U.S. patent application Ser. No. 09/063,335, filed Apr. 20, 1998, entitled "Method and Apparatus for Providing A Virtual Desktop System Architecture" and assigned to the present assignee, and incorporated herein by reference.

Thus, secure PIN entry in a distributed network is described in conjunction with one or more specific embodiments. The invention is defined by the claims and their full scope of equivalents.

The invention claimed is:

1. A method for authenticating a personal identification number (PIN) comprising:
    obtaining one or more keycodes from a user via a keycode input device connected to a client;
    placing said keycodes in a buffer of said client when instructed by a server connected to said client and disconnecting said keycode input device from said server;
    sending said keycodes to a smart card coupled to said client, said smart card containing said PIN; and
    comparing said keycodes to said PIN in a smart card processor in said smart card to determine whether said keycodes match said PIN, wherein said smart card processor communicates to said server that said keycodes match said PIN if said keycodes match said PIN, wherein said client and said server comprise a virtual desktop system architecture such that said client consists of a plurality of user input devices, a plurality of output generation devices, and at least one network control block to communicate to said server, and such that said server performs substantially all data computations.

2. The method of claim 1 further comprising:
    converting said key codes to an ASCII text format.

3. The method of claim 1 wherein said step of sending further comprises:
    embedding said keycodes in an application protocol data unit (APDU) using one or more patterns.

4. A system for authenticating a personal identification number (PIN) comprising:
    one or more keycodes configured to be obtained from a user via a keycode input device connected to a client;
    a buffer of said client configured to receive said keycodes when instructed by a server connected to said client and disconnecting said keycode input device from said server;
    a smart card, said smart card containing said PIN, wherein said smart card is configured to compare said keycodes to said PIN in a smart card processor in said smart card to determine whether said keycodes match said PIN, wherein said smart card processor communicates to said server that said keycodes match said PIN if said keycodes match said PIN, wherein said client and said server comprise a virtual desktop system architecture such that said client consists of a plurality of user input devices, a plurality of output generation devices, and at least one network control block to communicate to said server, and such that said server performs substantially all data computations.

5. The system of claim 4 further comprising:
    a converter configured to transform said keycodes to an ASCII text format.

6. A computer program product comprising:
    a computer usable medium having computer readable program code embodied therein configured to authenticate a personal identification number (PIN), said computer program product comprising:
    computer readable code configured to cause a computer to obtain one or more keycodes from a user via a keycode input device connected to a client;
    computer readable code configured to cause a computer to place said keycodes in a buffer of said client when instructed by a server connected to said client and disconnecting said keycode input device from said server;
    computer readable code configured to cause a computer to send said keycodes to a smart card coupled to said client, said smart card containing said PIN, and
    computer readable code configured to cause a computer to compare said keycodes to said PIN in a smart card processor in said smart card to determine whether said keycodes match said PIN, wherein said smart card processor communicates to said server that said keycodes match said PIN if said keycodes match said PIN, wherein said client and said server comprise a virtual desktop system architecture such that said client consists of a plurality of user input devices, a plurality of output generation devices, and at least one network control block to communicate to said server, and such that said server performs substantially all data computations.

7. The computer program product of claim 6 further comprising:
    computer readable code configured to cause a computer to convert said keycodes to an ASCII text format.

8. The computer program product of claim 6 wherein said computer readable code configured to cause a computer to send further comprises:
    computer readable code configured to cause a computer to embed said keycodes in an application protocol data unit (APDU) using one or more patterns.

* * * * *